United States Patent
Pace et al.

(10) Patent No.: US 6,786,318 B1
(45) Date of Patent: Sep. 7, 2004

(54) LOW FRICTIONAL TRANSFER APPARATUS

(76) Inventors: Paul G. Pace, 8972 W. Lisbon La., Peoria, AZ (US) 85381; Lee R. Huang, 27000 Karns Ct., #2801, Canyon Country, CA (US) 91387

( * ) Notice: Subject to any disclaimer, the term of this patent is extended or adjusted under 35 U.S.C. 154(b) by 41 days.

(21) Appl. No.: 10/383,340

(22) Filed: Mar. 6, 2003

(51) Int. Cl.[7] .............................................. B65G 13/00
(52) U.S. Cl. .............................. 193/35 SS; 193/35 MD
(58) Field of Search ........................ 193/35 SS, 35 MD

(56) References Cited

U.S. PATENT DOCUMENTS

| | | | | |
|---|---|---|---|---|
| 4,553,795 A | * | 11/1985 | Takagi ..................... | 193/35 SS |
| 4,627,526 A | * | 12/1986 | Masciarelli ............. | 193/35 SS |
| 4,706,793 A | * | 11/1987 | Masciarelli ............. | 193/35 SS |
| 5,328,540 A | * | 7/1994 | Clayton et al. ............ | 156/285 |
| 5,464,086 A | * | 11/1995 | Coelln .................... | 193/35 SS |
| 6,279,716 B1 | * | 8/2001 | Kayatani et al. ........ | 193/35 MD |
| 6,516,934 B2 | * | 2/2003 | Masciarelli, Jr. ........ | 193/35 SS |

* cited by examiner

Primary Examiner—Gene O. Crawford
(74) Attorney, Agent, or Firm—Jack C. Munro

(57) ABSTRACT

A transfer apparatus for permitting ease of movement of a workpiece across an operating surface of a table where the table includes a plurality of slots. Mounted within each slot is a rail member. Mounted within each rail member is a plurality of rolling members. The rail member is to be vertically movable within its respective slot so as to have the rolling members be totally confined within the rail member or have the rolling members protrude from the upper surface of the rail member. The rail member includes a plurality of pistons which are mounted within cylinders. Air pressure is to be supplied to each of the cylinders which is to cause the rail member to be moved vertically in an upward direction and cause the rolling members to protrude above the working surface of the table so that a workpiece can be completely supported by the rolling members and be spaced from the working surface of the table.

11 Claims, 2 Drawing Sheets

LOW FRICTIONAL TRANSFER APPARATUS

BACKGROUND OF THE INVENTION

1. Field of the Invention

The field of this invention relates to apparatuses that facilitate the movement of heavy structures and more particularly to a low frictional transfer apparatus that is to be incorporated in conjunction with the operating surface of a table on which the heavy object is designed to rest.

2. Description of the Related Art

Forming machines, such as punching and stamping machines, have a table on which is to be located a workpiece. It is common for these tables, which are frequently referred to as a bolster, to have a planar operating surface which is the upper surface of the table. The workpiece is to be placed on this operating surface.

It is typical that workpieces weigh several hundred pounds. The workpiece will always have to be adjusted in position on the table until the workpiece is in a precisely located position on the table at which time the workpiece is locked in position and then the parts that are to be produced utilizing of the workpiece are then produced. In the past, it has been typical that the movement of the workpiece is accomplished manually or by power by the machine operator. This means that the operator will physically press against the workpiece in order to get the workpiece to move an inch, one-half inch, an eighth of an inch or whatever. The moving of a workpiece that weighs several hundred to thousands of pounds is not easily accomplished by such manual or powered movement. Small movements are produced by a tool known as a die bar.

Typically, workpieces are also transported within machine shops to the bolster of a punching and stamping machine by means of a cart. The workpiece is placed on the cart and the cart is rolled to a position directly adjacent the bolster and the workpiece is then moved from the cart onto the operating surface of the bolster. The cart includes a table on which the workpiece is located. Again, manual movement is required to get the workpiece to move from the cart to the bolster. It would be desirable to incorporate some type of a low frictional transfer apparatus in conjunction within tables of carts and in conjunction with bolsters of punching and stamping machines and in conjunction with tables of any type of a forming machine that would make it substantially easier to manually move a heavy workpiece.

SUMMARY OF THE INVENTION

In combination with a table for supporting a workpiece, a low frictional transfer apparatus for permitting ease of movement of the workpiece across an operating surface of the table. Incorporated within the table are a plurality of spaced apart slots. A rail member is to be mounted within at least two in number of the slots with there being a separate rail member within each slot. Each rail member has a plurality of rolling members protruding from its upper surface. Each rail member includes a plurality of pistons capable of extending from its lower surface. The pistons include footpads. The footpads are extendable from the lower surface of the rail member by the application of pressurized air to the pistons which will then cause the rolling members to be raised above the working surface of the table with the workpiece resting solely on these rolling members. The rolling members permit easy movement of the workpiece on the working surface.

A further embodiment of the present invention is where the main embodiment is modified by the slots being defined as being straight.

A further embodiment of the present invention is where the main embodiment is modified by the slots being defined as parallel.

A further embodiment of the present invention is where the main embodiment is modified by the slots being defined as having an upside down T-shape cross-sectional configuration.

A further embodiment of the present invention is where the main embodiment is modified by the rolling members being defined as being balls.

A further embodiment of the present invention is where the main embodiment is modified by the piston assembly comprising a plurality of pistons that are mounted in a spaced apart arrangement within each rail member. Each piston is movably mounted within a cylinder with there being a separate cylinder for each piston. A connecting passage connects between directly adjacent pairs of cylinders. The air pressure to be supplied to the cylinders being permitted to flow through these connecting passages.

A further embodiment of the present invention is where the main embodiment is modified by each rolling member being mounted within a housing. There is mounted a spring between the housing and the rail member to provide a resilient slightly deflectable support for the rolling members when the weight of the workpiece is applied to the rolling members.

A further embodiment of the present invention is where the just previous embodiment is modified by each piston being movably mounted within a cylinder with there being a separate cylinder for each piston. A connecting passage connects between directly adjacent pairs of the cylinders with the air pressure to be supplied to each cylinder by being permitted to flow through these connecting passages.

A further embodiment of the present invention is where the just previous embodiment is modified by the rolling members being defined as balls.

A further embodiment of the present invention is where the just previous embodiment is modified by the slot in transverse cross-section having an upside down T-shape.

A further embodiment of the present invention is where the just previous embodiment is modified by the slots being defined as parallel.

A further embodiment of the present invention is where the just previous embodiment is modified by the slots being defined as being straight.

BRIEF DESCRIPTION OF THE DRAWINGS

For a better understanding of the present invention, reference is to be made to the accompanying drawings. It is to be understood that the present invention is not limited to the precise arrangement shown in the drawings.

DETAILED DESCRIPTION OF THE INVENTION

Figure 1:
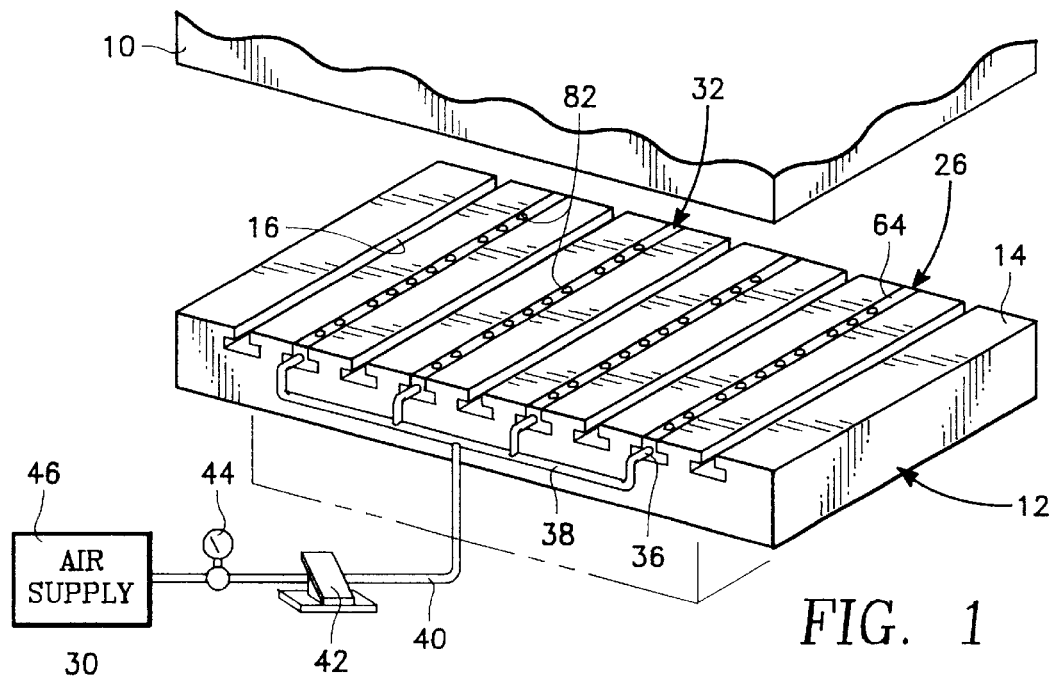
FIG. 1 is a diagrammatic representation of a bolster of a punching or stamping machine within which has been mounted the transfer apparatus of the present invention.
Figure 2:
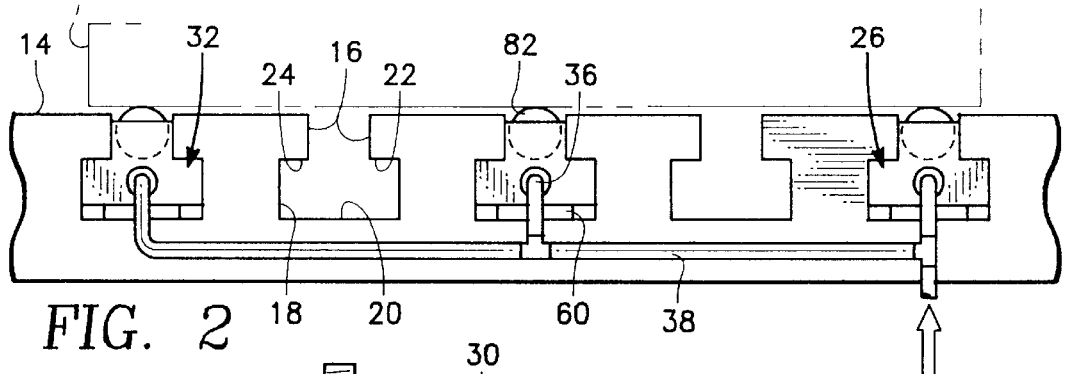
FIG. 2 is an enlarged end view of the bolster showing the transfer apparatus in the position which will permit low frictional movement of a workpiece across the operating surface of the bolster.
Figure 3:
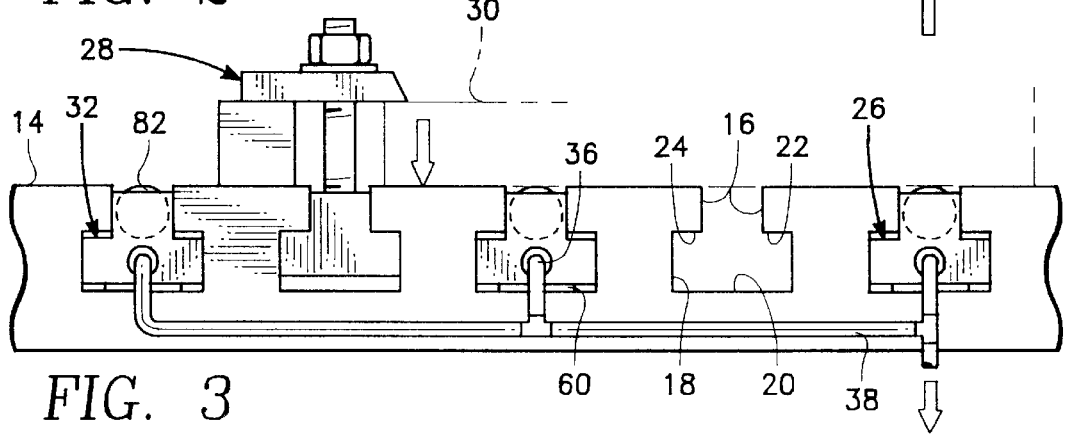
FIG. 3 is a view similar to FIG. 2 but where the transfer apparatus is in a lowered position and the workpiece is resting directly on the operating surface of the bolster.
Figure 4:
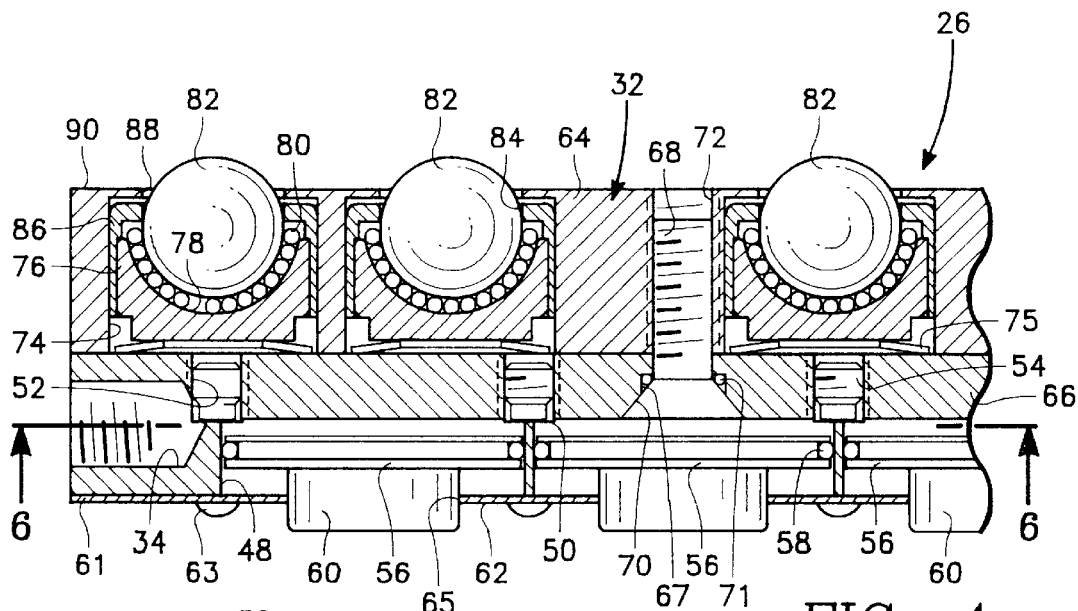
FIG. 4 is a longitudinal cross-sectional view through a portion of one of the rail members of the transfer apparatus of the present invention.
Figure 5:
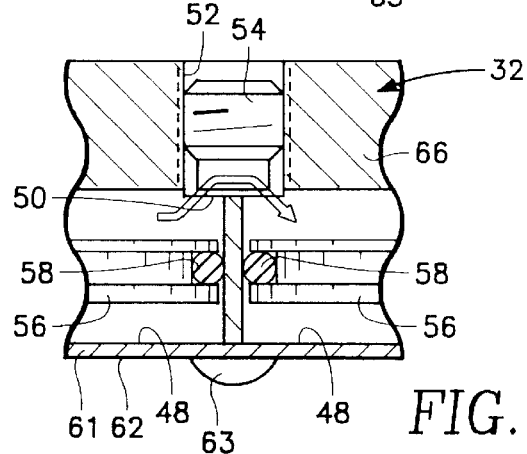
FIG. 5 is an enlarged cross-sectional view of a portion of the rail assembly showing the connecting passage arrangement between a directly adjacent pair of cylinders which are to receive air pressure.
Figure 6:
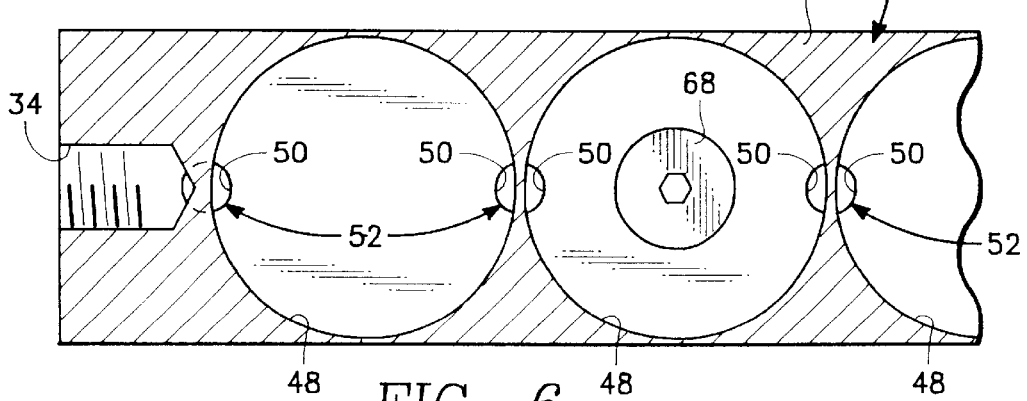
FIG. 6 is a cross-sectional view taken along line 6—6 of FIG. 4.

Referring particularly to the drawings, there is shown in FIG. 1 the basic parts of a punching or stamping machine which comprises a movable ram or slide 10 and a table or bolster 12. The ram or slide 10 is movable toward and away from the bolster 12. The bolster 12 may be fixed in position or may be movably horizontally. The bolster 12 has an upper planar surface which is defined as the working surface 14. Formed within the bolster 12 and connecting with the operating surface 14 are a series of slots 16. The slots 16 are all of the same configuration and of the same size, although this is not mandatory in order to reduce to practice the present invention. The slots 16 are evenly spaced apart and are straight and parallel. The slots 16 in transverse cross-section assume a configuration of an upside down T-shape forming an enlarged lower cavity 18 which has a bottom wall 20 and an upper surface which is formed into a pair of spaced apart shoulders 22 and 24. Mountable by merely sliding therewithin is a rail assembly 26. The rail assembly 26 is to be located within some but normally not all of the slots 16. The slots 16 can also be used in conjunction with a conventional clamping device 28. The function of the clamping device 28 is to engage with an edge of a workpiece 30 which generally will be in the form of a die. The clamping device 28 will function to fixedly mount the workpiece 30 onto the working surface 14.

As shown in FIG. 1, there are four in number of rail assemblies 26 each mounted in conjunction with a slot 16. Each rail assembly 26 includes an elongated rail member 32 which will normally be constructed of steel. Within one end of the rail member 32 is a threaded hole 34. Threadably connected within the threaded hole 34 is a conduit 36. There is to be a separate conduit 36 for each rail member 32. The conduits 36 are connected to a manifold conduit 38. The manifold conduit 38 is connected to a main supply conduit 40. The main supply conduit 40 is connected to a hand operated valve 42, a pressure gauge 44 and to a source 46 of pressurized air. Manipulating the valve 42 will cause pressurized air to be connected through the main supply conduit 40, the manifold conduit 38 to each of the conduits 36 and into within the rail member 32. Formed within the rail member 32 are a series of cylinders 48. Each directly adjacent pair of the cylinders 48 are connected by a connecting passage 50. The connecting passages 50 are formed by drilling of a hole 52 through the rail member 32 and intersecting with both of the cylinders 48 that are located directly adjacent to each other. Once each of the holes 52 is drilled, a threaded plug 54 coated with sealant is then mounted within each of the holes 52 to close off and prevent air from leaking through the hole 52. As a result, the pressurized air is only permitted to sequentially flow from threaded hole 34 through each connecting passage 50 and into the cylinders 48.

Mounted within each cylinder 48 is a piston 56. Around the periphery of each piston 56 is an O-ring seal 58. The piston 56 is to be movable upward and downward within its respective cylinder 48. Attached to the lower end of the piston 56 is a footpad 60. There is to be an individual footpad 60 for each piston 56. The footpad 60 constitutes a cylindrically shaped member which protrudes from the lower surface 62 of the rail member 32. Therefore, it is to be understood that when pressurized air is supplied to within each of the cylinders 48 that the pistons 56 will be moved toward the lower surface 62 which will cause the foot pad 60 to protrude and apply force against the bottom wall 20 of each of the slots 16. This will cause the rail member 32 to be raised and will be stopped only by the rail member 32 coming into contact with the shoulders 22 and 24 or by piston 56 contacting cover 61. This is defined as the upper position of the rail member 32 and the lower position is defined when the rail member 32 is spaced from the shoulders 22 and 24. Then lower portion of each cylinder 48 is closed by a cover 61 which is fixed to a lower rail member 66 to a series of bolts 63. Cover 61 will include a series of holes 65 with a footpad 60 passing through each hole 65 in a close fitting manner that permits ease of movement of the footpad 60 relative to the cover 61. Each footpad 60 must be wide enough to provide non-skewing of the pistons 56. Each footpad 60 must be at least one-quarter of an inch in diameter. A preferable diameter for each footpad 60 is three-quarters of an inch in diameter.

The rail member 32 is actually constructed of two separate parts, an upper rail member 64 and the lower rail member 66. The rail members 64 and 66 are fixedly mounted together by means of screw fasteners 68. Each screw fastener 68 is to be mounted through a hole 70 formed through the lower rail member 66 which is aligned with threaded hole 72 formed within the upper rail member 64. Surrounding each O-ring fastener is an O-ring seal 71 which nests in annular groove 67. Seal 71 prevents escape of air pressure from within the cylinders 48 past the fasteners 68. Within a typical rail assembly 26, there will be utilized two or more in number of the screw fasteners 68. One reason that the rail member 32 is formed of separate rail members 64 and 66 is so that the holes 52 can be formed prior to interconnecting together the rail members 62 and 64. Another reason is that it permits forming through the bottom edge of the upper rail member 64 a plurality of cylindrically shaped cavities 74. Typically, there will be ten or more of the cavities 74 formed within each rail assembly 26.

Mounted within each cavity 74 is a housing which includes a block 76. The block 76 includes a semispherical cavity 78. It is to be understood that there will be somewhere in the range of ten or more in number of the blocks 76. Mounted within each cavity 78 are a plurality of ball bearings 80. Resting on the ball bearings 80 is a rolling member in the form of a ball 82. It is considered to be within the scope of this invention that other rolling members could be utilized. It happens that a ball shaped rolling member seems to be preferable. The ball protrudes through a hole 84 formed within a cap 86. The cap 86 is fixedly secured to the block 76. The size of the hole 84 is to prevent the ball 82 from disconnection with the semispherical cavity 78 and connection with the ball bearings 80. In other words, the diameter of the hole 84 is just slightly less than the overall diameter of the ball 82. The exterior surface of the cap 86 is fixedly mounted to the sidewall of the cavity 74. The ball 82 will also protrude through a hole 88 formed within the upper rail member 64. It is to be understood that there will also be eleven or more of the balls 82. Each ball 82 will protrude from the upper surface 90 of the upper rail member 64.

When air pressure is supplied to within each of the cylinders 48 and the pistons 56 are driven in a downward direction, each of the balls 82 are caused to protrude exteriorly of each of their respective slots 16 and above the operating surface 14 of the bolster 12. The workpiece 30 will then be supported completely by the balls 82 of at least two of the rail assemblies 26. If the workpiece 30 is of the width of all of the slots 16 then the workpiece will rest on some of the balls of each rail assembly 26. The result is the operator can then manually move with a minor amount of manual force the workpiece 30, and once the desired precise position of the workpiece 30 is obtained the operator will then release pressure on the valve 42 which will then cause the pressurized air to be vented from a vent (not shown) from each of the cylinders 48. As a result, each rail member 32 will then be lowered in position with each ball 82 being located beneath the operating surface 14. The workpiece 30 will then rest directly on the operating surface 14 of the bolster 12.

Anytime the operator wishes to affect movement of the workpiece 30, it is only necessary that the operator apply pressure to the valve 42 which will cause the balls 82 to extend and raise the workpiece 30 so that it again rests on the balls 82 and can be readily moved.

What is claimed is:

1. In combination with a table for supporting a workpiece, a low frictional transfer apparatus for permitting ease of movement of the workpiece across an working surface of said table, said table comprising:

a plurality of slots formed within said table with said slots being open to said working surface, said slots being spaced apart; and a rail member mounted within each of said slots, said rail member having an upper surface and a lower surface, each said rail member having a plurality of rolling members protruding from said upper surface, each said rail member having a plurality of pistons, said pistons mounted in a spaced apart arrangement within each said rail member, each piston of said pistons being movably mounted within a cylinder with there being an individual said cylinder for each said piston, a connecting passage connecting between each directly adjacent pair of said cylinders with there being a plurality of connecting passages, said pistons having footpads, said footpads being extendable from said lower surface of said rail member by the application of pressurized air to said piston assembly which will cause said rolling members to be raised with the workpiece resting solely on said rolling members permitting the workpiece to be moved across said working surface of said table, the pressurized air to flow sequentially to said pistons through said connecting passages, upon release of the air pressure said rolling members will be lowered which will cause the workpiece to rest directly on said working surface and not be readily movable.

2. The combination as defined in claim 1 wherein:

said slots being straight.

3. The combination as defined in claim 1 wherein:

said slots being parallel.

4. The combination as defined in claim 1 wherein:

each of said slots in transverse cross-section having an upside down T-shape.

5. The combination as defined in claim 1 wherein:

said rolling members comprising a plurality of balls.

6. The combination as defined in claim 1 wherein:

each of said footpads having a diameter of at least one-quarter of an inch.

7. The combination as defined in claim 1 wherein:

each said rolling member being mounted within a housing, a spring mounted between said housing and said rail member to provide a resilient slightly deflectable support for said rolling members when the weight of the workpiece is applied to said rolling members.

8. The combination as defined in claim 7 wherein:

said rolling members comprising a plurality of balls.

9. The combination as defined in claim 8 wherein:

each of said slots in transverse cross-section having an upside down T-shape.

10. The combination as defined in claim 9 wherein:

said slots being parallel.

11. The combination as defined in claim 10 wherein:

said slots being straight.

* * * * *